US005672557A

United States Patent [19]

Williamson et al.

[11] Patent Number: 5,672,557

[45] Date of Patent: Sep. 30, 1997

[54] PALADIUM-CONTAINING THREE-WAY AUTOMOTIVE CATALYSTS HAVING UNIQUE SUPPORT

[75] Inventors: W. Burton Williamson, Broken Arrow; Ronald G. Silver, Tulsa, both of Okla.; Jack C. Summers, Newtown, Pa.

[73] Assignee: ASEC Manufacturing, Catoosa, Okla.

[21] Appl. No.: 625,756

[22] Filed: Mar. 29, 1996

Related U.S. Application Data

[63] Continuation-in-part of Ser. No. 951,969, Sep. 28, 1992.

[51] Int. Cl.$^6$ ............................ B01J 21/04; B01J 23/10; B01J 23/44

[52] U.S. Cl. ........................ 502/303; 502/304; 502/333; 502/355

[58] Field of Search ........................ 502/303, 304, 502/415, 333, 355

[56] References Cited

U.S. PATENT DOCUMENTS

| | | | |
|---|---|---|---|
| 4,170,573 | 10/1979 | Ernest | 252/462 |
| 4,528,279 | 7/1985 | Suzuki et al. | 502/200 |
| 4,868,149 | 9/1989 | Bricker | 502/303 |

FOREIGN PATENT DOCUMENTS

| | | |
|---|---|---|
| A 0 310 398 | 4/1989 | European Pat. Off. . |
| A 0441 173 | 8/1991 | European Pat. Off. . |
| A 91 08827 | 6/1991 | WIPO . |

*Primary Examiner*—Glenn A. Caldarola
*Assistant Examiner*—Alexander G. Ghyka
*Attorney, Agent, or Firm*—Kuffner & Associates

[57] ABSTRACT

A palladium three-way catalyst is supported on a unique ceria-lanthana-alumina support where the alumina content is lower than previously believed necessary to maintain catalyst activity. Preferably the ceria and lanthana constitute the major proportion of the support.

8 Claims, No Drawings ns. The results
PALADIUM-CONTAINING THREE-WAY AUTOMOTIVE CATALYSTS HAVING UNIQUE SUPPORT This application is a continuation-in-part of application Ser. No. 07/951,969 filed Sep. 28, 1992.

BACKGROUND OF THE INVENTION

This invention relates to catalysts used to remove undesirable components in the exhaust gases from internal combustion engines. More particularly, this invention relates to palladium-only TWC catalysts and methods and systems for using such catalysts to reduce the levels of undesirable components in the exhaust from automobile engines. The exhaust from internal combustion engines contains hydrocarbons, carbon monoxide and nitrogen oxides which must be removed to levels established by government regulations. Most frequently this is done by placing catalyts in the exhaust stream which are capable of removing all three contaminants at the same time and consequently are referred to as three-way or TWC catalysts.

Maximum conversion of all three exhaust gas contaminants can be achieved by a typical TWC catalyst only when the engine is operating in a narrow range of air/fuel ratio on either side of the stoichiometric value (typically a weight ratio of 14.5/1). This optimum range is often referred to as the "A/F window." Modem motor vehicle engines are typically made to operate within the A/F window using an oxygen sensor as a reference to control the proper air/fuel ratio. Since the air/fuel ratio is controlled through a feed back control loop, there is a normal oscillation of the composition of the exhaust gas from rich to lean, i.e. the gases vary from containing less to containing more oxygen than the target value. On the lean side, an excess of oxidants produces an oxidizing mixture and on the rich side an excess of reducing components is present.

Typical TWC catalysts contain small amounts of Group VIII metals, such as platinum, palladium and rhodium, supported on a high surface area support such as alumina. While γ-alumina is often preferred, other forms of alumina such as delta, eta, theta, and alpha alumina may be present in the support. Other metal oxides such as zirconia, titania, and rare earth oxides have been suggested in the art as supports for TWC catalysts, usually in combination with some form of alumina. For optimum performance the TWC catalyst will also often contain promoters, such as the alkaline earth metal oxides, including barium and strontium, transition metals such as iron and nickel, and rare earth oxides including ceria and lanthana. The function of these promoters is not fully understood but it is believed that they may have several functions, among which is the stabilization of the supports to prevent or limit crystalline phase changes and resultant loss of surface area.

Recently there has been a revival of commercial interest in the use of palladium in combination with or as a replacement for platinum/rhodium in TWC catalysts. The use of palladium in auto exhaust catalysts has traditionally suffered from a number of drawbacks. These include the high sensitivity of palladium to poisoning by sulphur and lead, and the reported lower catalytic efficiency of palladium. However, lead has now been removed from most gasoline supplies in the United States and Japan, and Europe is following. Thus, palladium is much more promising as a potential substitute for the platinum and rhodium used in present catalysts. Further, its much lower cost makes palladium a highly desirable alternative to platinum/rhodium in TWC catalysts, provided the desired performance can be achieved.

We have found that supporting palladium-only catalysts on a unique ceria-lanthana-alumina support provides TWC catalysts with greatly improved performance after severe aging. An important characteristic of the unique support is that the amount of alumina is lower than had previously been considered necessary to maintain appropriate catalytic activity. For example, in Japanese Kokai 130230/81, Nissan stated that when the amount of the rare earths exceeds 45 wt. % of the alumina the performance deteriorates. The results show that catalysts containing 50 g/L of alumina had poorer performance than those with 100 g/L.

SUMMARY OF THE INVENTION

It is an object of the present invention to provide unique palladium-only catalysts for automotive exhaust applications. This is accomplished by employing a support having a unique ratio of cerium and lanthanum to alumina and which contains less alumina than has previously been thought necessary to maintain catalyst activity. Based on application of the support to a non-porous monolith, catalysts of the invention will contain less than about 100 g/L $Al_2O_3$ and preferably about 50 g/L or less down to about 6 g/L. In one embodiment, the amount of alumina is about 15 g/L. The catalysts will contain from about 80 g/L up to about 300 g/L Ce+La (as the metals). Preferably, the Ce+La content will be above 100 g/L, more preferably above 150 g/L. The weight ratio of Ce to La is also important and will be about 0.3/1 to 10/1, preferably 0.5/1 to 6/1.

In one aspect the invention includes a method for reducing the levels of carbon monoxide, hydrocarbons, and nitrogen oxides in the exhaust gases from internal combustion engines using palladium-only catalysts supported on the ceria-lanthanum-alumina support just described.

DESCRIPTION OF THE PREFERRED EMBODIMENTS

Support

The ceria-lanthana-alumina support of the invention contains a unique ratio of these elements. It has been found that, contrary to the common belief of those skilled in the art, a support containing relatively large amounts of ceria and lanthana and a lesser amount of alumina provides exceptionally high performance, seen after severe aging when used with palladium alone.

Various types of alumina may be used i.e., gamma, delta, theta, eta, etc. The amount of alumina will be less than about 100 g/L on a non-porous monolithic substrate and preferably about 60 g/L down to about 6 g/L. Catalysts containing lower amounts of alumina would be expected to have poorer performance as the amount of alumina approaches zero. The amount of ceria and lanthana expressed as the metals (Ce+La) will be at least 80 g/L up to about 300 g/L and preferably above 100 g/L, more preferably above 150 g/L.

The method of preparation of the support is not believed to be critical. Generally, we have found it effective to combine a finely-divided alumina with a solution of cerium and lanthanum compounds and thereafter dry and calcine the combination at temperatures up to about 600° C. to form the support. Other methods such as co-precipitation from a solution of all three elements (Ce, La, Al) also may be used.

Noble Metals

The noble metals from Group VIII of the Periodic Table particularly platinum, palladium, and rhodium are commonly used in auto-exhaust catalysts, either alone or in combinations. The catalysts of the present invention use palladium alone. However supplemental amounts of the other noble metals may be included so long as the advantages of the invention are retained. The amount of noble metals employed preferably will be about 0.01 to 10 wt. % based on the total weight of the catalyst, more preferably about 0.05 to 5.0 wt. %.

The noble metals are applied to the support of the invention by decomposing a noble metal compound which has been deposited on the support. Examples of palladium compounds include chloropalladic acid, palladium chloride, palladium nitrate, diamminepalladium hydroxide and tetraamminepalladium chloride. Preferred compounds are chloropalladic acid and palladium nitrate.

The noble metals may be applied separately or in combination, but typically they will be in a solution which is used to impregnate the support by techniques familiar to those skilled in the art.

Promoters

In addition to the ceria-lanthana-alumina, the support of the invention may incorporate other compounds, such as alkaline earth, zirconium, manganese, nickel and molybdenum compounds, to function as promoters of catalytic activity. In general, effective amounts of the promoters will be used, which may vary considerably depending on the particular compound employed. The amounts will be about 1 to 50 wt. %, preferably about 5 to 20%, of the total support.

These promoter elements will also be applied as decomposable compounds, usually in an aqueous solution, by methods familiar to those skilled in the art. Examples of such compounds include the halides, nitrates, and acetates, preferably the acetates. After calcining at a temperature of about 400° C. to about 700° C. for about 1 to 3 hours, the promoter elements will be present as their metal oxides.

Catalyst Preparation

Catalysts of the invention may be prepared by methods known to those skilled in the art and have in common the use of the unique support of the invention for noble metals and promoters.

The support is preferably reduced, as by milling, to provide particles of a suitable size (usually between about 1 μm to 50 μm) and then dried at a temperature of about 100° C. to 600° C. to produce a powder suitable for washcoating a relatively non-porous substrate. The powder is then slurried in water or some other suitable liquid and the substrate immersed, sprayed, or otherwise covered with the slurry. The substrate preferably will be a monolith of the type commonly used in commercial practice. Although not preferred, non-porous pellets can also be coated with the support in a similar manner with similar proportions of ceria, lanthana, and alumina. Upon drying, the substrate is then ready to receive the active catalytic metals and promoters.

Alternatively, the support may be impregnated or otherwise have the active catalytic metals and promoters directly deposited therein before the slurry is made up and the substrate coated.

In either case, the noble metals and promoters are applied to the support by methods familiar in the art. In particular, it is preferred to apply them by co-impregnation. The order of application of these metals is not believed to be an essential aspect of the invention.

EXAMPLE 1

(Comparative)

A series of tests were conducted to demonstrate the effect on catalyst performance of reduced amounts of alumina.

Two catalysts were prepared which differed in the amount of alumina in the support. The ratio of Ce+La to $Al_2O_3$ was kept the same and the total amount of noble metal was the same in each. The supports were applied in a slurry as washcoats to a monolith carrier and then the coated monolith was impregnated with a Pd solution.

Catalyst A was prepared as follows: A powdered alumina (Condea Puralox SCFA-90) was mixed with cerium acetate and lanthanum acetate in aqueous solutions to provide a $Al_2O_3$/Ce weight ratio of 1/1 and a $Al_2O_3$/La weight ratio of 7.35/1. The mixture was dried and calcined at 538° C. for one hour. After cooling, the resulting powder was slurried in water with nitric acid and $BaSO_4$ and applied to a cordierite monolith supplied by Coming which had 62 square cells per centimeter. The volume of the test monolith was 1.7 L and the amount of the washcoat was 260 g/L with 103.7 g/L $Al_2O_3$. The cerium, lanthanum and barium loadings were 103.8 g/L, 14.13 g/L, and 7.42 g/L respectively. The washcoated monolith was immersed in an aqueous solution of $H_2PdCl_4$ and 5 wt. % sugar to provide an impregnated monolith containing 1.41 g/L Pd.

A second catalyst (B) was prepared in the same manner as catalyst A except that the amount of $Al_2O_3$ was reduced and the amounts of Ce, La, and Ba were also reduced to maintain the same proportional ratio with the $Al_2O_3$. The finished monolith contained 1.41 g/L Pd, 69.57 g/L Ce, 9.54 g/L La, 4.94 g/L Ba, and 69.57 g/L $Al_2O_3$.

The two catalysts were compared by exposing each to the exhaust gas from an engine operated at and near stoichiometric condition with the test conditions set up to also provide accelerated aging of the catalysts.

A Ford 5 liter V-8 engine having throttle body fuel injection was operated for 60 seconds with a predetermined air-fuel ratio, followed by 5 seconds with no fuel so that the air-fuel ratio becomes very lean. The cycle was repeated for a predetermined period of time. The fuel was a commercial lead-free premium fuel to which 15 mg Pb/gal and 2 mg P/gal and 50–150 wt. ppm of sulfur were added.

Two tests were carried out, one for 100 hours and the second under slightly more severe conditions for 150 hours.

The performance of the catalysts was determined in another test also using the exhaust gases from a Ford 5 liter V-8 engine. In this test, the hydrocarbon (HC), carbon monoxide (CO), and nitrogen oxides ($NO_x$) at the catalyst outer were measured for a series of air-fuel weight ratios which traversed the stoichiometric and near-stoichiometric region from air-fuel ratios of 15/1 to 14/1. At each nominal value, the air-fuel ratio fluctuated ±0.4 units @1 Hz. The space velocity of the gases was about 30,000 $hr^{-1}$. The integral performance is reported at the conversion at air-fuel ratios of 14.71, 14.66, 14.61, 14.56, 14.51, 14.46, and 14.41. The performance at stoichiometric conditions is represented at an air-fuel ratio of 14.56, while an air-fuel ratio of 14.85 is slightly lean and an air-fuel ratio of 14.25 is slightly rich. The fuel used is indolene (Amoco unleaded) with traces of Pb and P and 50–150 wt. ppm of S. The nitrogen oxides at the inlet of the catalyst was controlled at 1800 wt. ppm ±50.

The "light-off" temperature was determined by continuously raising the temperature at the inlet of the catalyst over a range at which significant activity is normally experienced. When a predetermined percentage conversion is found, the temperature at the inlet is designated the light-off temperature, in these examples 50% conversion. A Ford 5 liter V-8 engine operated with a 14.56 A/F ratio (modulating ±0.4 units @1 Hz) supplied the exhaust gases, which were cooled to provide the desired temperature. A continuous traverse of a range of 200° C. up to 450° C. at 50° C./min was used, followed by a descending traverse from 460° C.

down to 200° C. at 63° C./min. The fuel was indolene with trace amounts of Pb and P and 50–150 wt. ppm S. The results of the tests are summarized in the tables below.

TABLE 1

| A/F Ratio | 100 Hour Test | | 150 Hour Test | |
|---|---|---|---|---|
| | Catalyst A | Catalyst B | Catalyst A | Catalyst B |
| Integral Stoich | | | | |
| HC | 97 | 94 | 97 > | 92 |
| CO | 92 | 88 | 87 > | 81 |
| NO$_x$ | 87 | 84 | 87 > | 81 |
| A/F = 14.85 | | | | |
| HC | 96 | 93 | 96 > | 92 |
| CO | 97 | 96 | 97 | 95 |
| NO$_x$ | 28 | 28 | 32 | 32 |
| A/F = 14.56 | | | | |
| HC | 98 | 95 | 98 | 94 |
| CO | 97 | 95 | 96 > | 91 |
| NO$_x$ | 98 | 95 | 97 > | 91 |
| A/F = 14.25 | | | | |
| HC | 64 | 61 | 66 > | 48 |
| CO | 37 > | 27 | 22 > | 15 |
| NO$_x$ | 98 > | 78 | 82 >> | 44 |
| 50% Conversion | | | | |
| HC | 366 | 377 | 373 | 373 |
| CO | 367 | 378 | 374 | 375 |
| NO$_x$ | 363 | 374 | 376 | 379 |

It can be seen from the listed results that the performance of Catalyst B (containing only 69.57 g/L Al$_2$O$_3$) was inferior compared to Catalyst A (containing 103.7 g/L Al$_2$O$_3$) after severe engine aging. This result is consistent with the expectation that at least 100 g/L of alumina are necessary with this type of catalyst in order to maintain effective activity after aging. However, we have found that much less alumina can be used successfully provided that the amounts of ceria and lanthana are increased, as will be seen in the following examples.

EXAMPLE 2

A series of catalysts were prepared as in Example 1 in which the mol ratio of Ce to La was held constant at 3.37/1, but the total Ce plus La loading was increased from about 65 g/L to about 275 g/L. In each successive catalyst the total amount of alumina was reduced, beginning at slightly above 100 g/L down to about 15 g/L. The catalysts were exposed to the same testing protocol as described in Example 1 except that the evaluation of catalyst performance after aging varied the air/fuel traverse from rich to lean conditions rather than from lean to rich as in Example 1. The light off test was as described in Example 1.

The catalysts had the following compositions as prepared:

| Catalyst | C | D | E | I |
|---|---|---|---|---|
| Ce, g/L | 42.38 | 84.75 | 127.1 | 211.9 |
| La, g/L | 12.57 | 25.4 | 37.71 | 62.86 |
| Ba, g/L | 5.65 | 5.65 | 5.65 | 5.65 |
| Al$_2$O$_3$, g/L | 107.4 | 84.2 | 61.0 | 14.6 |
| Ce/La | 3.37 | 3.37 | 3.37 | 3.37 |
| (Ce + La)/Al$_2$O$_3$ | 0.51/1 | 1.31/1 | 2.70/1 | 18.77/1 |

The results of testing the Catalysts C and E after aging are given in the following tables. Both employed 100 hours of engine aging with the difference being that the test in Table 2b is somewhat more severe in exposing the catalyst bed to 50°–100° C. higher temperatures than the aging reported in Table 2a. In both tables the results are compared to a typical commercial 1.4 g/L Pt/Rh catalyst which is supported on a washcoat of γ-alumina containing 36.37 g/L Ce and 4.59 g/L Ba.

It can be seen that after lower temperature aging (Table 2a) the Pt/Rh TWC catalyst is slightly better than Catalyst C with regard to NO$_x$ conversion but somewhat poorer with regard to hydrocarbon conversion. However, with more severe aging (Table 2B) Catalyst E is the most active (i.e. has a lower light off temperature) and has the highest conversions at the stoichiometric air fuel ratio (14.56).

TABLE 2a

| | Comparative Pt/Rh 5/1 @ 1.41 g/L | Catalyst C Pd-Only $\frac{Ce+La}{Al_2O_3}=\frac{65}{107}$ | Catalyst E Pd-Only $\frac{Ce+La}{Al_2O_3}=\frac{165}{61}$ |
|---|---|---|---|
| Intg. Perf. | | | |
| HC | 90 | 92 | 88 |
| CO | 79 | 79 | 78 |
| NO$_x$ | 79 | 77 | 74 |
| A/F = 14.85 | | | |
| HC | 94 | 93 | 92 |
| CO | 97 | 97 | 97 |
| NO$_x$ | 44 | 37 | 36 |
| A/F = 14.56 | | | |
| HC | 92 | 95 | 91 |
| CO | 85 | 87 | 85 |
| NO$_x$ | 82 | 86 | 83 |
| A/F = 14.25 | | | |
| HC | 47 | 51 | 44 |
| CO | 32 | 17 | 20 |
| NO$_x$ | 93 > | 49 | 48 |
| T50 Light off (50% Conversion) | | | |
| HC | 386 | 374 | 346 |
| CO | 379 | 378 | 339 |
| NO$_x$ | 365 | 381 | 346 |

TABLE 2b

| | Comparative Pt/Rh 5/1 @ 1.41 g/L | Catalyst C Pd-Only $\frac{Ce+La}{Al_2O_3}=\frac{65}{107}$ | Catalyst E Pd-Only $\frac{Ce+La}{Al_2O_3}=\frac{165}{61}$ |
|---|---|---|---|
| Intg. Perf. | | | |
| HC | 82 | 94 | 93 |
| CO | 61 < | 78 | 80 |
| NO$_x$ | 69 < | 79 | 79 |
| A/F = 14.85 | | | |
| HC | 93 | 95 | 95 |
| CO | 91 | 98 | 99 |
| NO$_x$ | 44 | 39 | 38 |
| A/F = 14.56 | | | |
| HC | 83 < | 96 | 95 |
| CO | 61 < | 85 | 90 |
| NO$_x$ | 69 < | 85 | 90 |
| A/F = 14.25 | | | |
| HC | 42 | 53 | 52 |
| CO | 27 | 18 | 19 |

TABLE 2b-continued

|  | Comparative Pt/Rh 5/1 @ 1.41 g/L | Catalyst C Pd-Only $\frac{Ce+La}{Al_2O_3} = \frac{65}{107}$ | Catalyst E Pd-Only $\frac{Ce+La}{Al_2O_3} = \frac{165}{61}$ |
|---|---|---|---|
| $NO_x$ T50 Light off | 83 > | 52 | 70 |
| HC | 412 | 367 | 356 |
| CO | 411 | 368 | 357 |
| $NO_x$ | 398 | 376 | 356 |

EXAMPLE 3

A series of catalysts were made and tested following the procedures and protocols of Example 1 except that no barium was added to the washcoat. In addition, the amount of $Al_2O_3$ was kept constant and the amounts and ratio of Ce and La was changed. The composition of the catalysts is summarized as follows:

| Catalyst | F | G | H |
|---|---|---|---|
| Ce, g/L | 31.79 | 63.57 | 63.57 |
| La, g/L | 63.57 | 63.57 | 15.89 |
| $Al_2O_3$, g/L | 125.7 | 126.9 | 125.1 |
| Ce/La | 0.5/1 | 1/1 | 4/1 |
| (Ce + La)/$Al_2O_3$ | 95/125 | 127/127 | 79/125 |

Catalyst aging and testing was carried out as described in Examples 1 and 2 except that only the more severe engine aging test was used for 100 hours. The evaluation of the aged catalyst was carried out using a traverse of air fuel ratios from lean to rich as described in Example 1. The results are shown in the following table.

It can be seen that higher Ce/La ratios improve the integral and stoichiometric (A/F=14.56) conversions of these catalysts, especially the CO and $NO_x$ conversion. Less effect is seen on rich and lean air/fuel ratios and on light off temperature. Although the alumina content is somewhat higher than preferred for the catalysts of the invention, the relative effect of the ratio of Ce/La is expected also to apply to catalyst containing 100 g/L $Al_2O_3$ or less.

TABLE 3

|  | Catalyst F 1.41 g/L Pd $\frac{Ce+La}{Al_2O_3} = \frac{95}{125}$ | Catalyst G 1.41 g/L Pd $\frac{Ce+La}{Al_2O_3} = \frac{127}{127}$ | Catalyst H 1.24 g/L Pd $\frac{Ce+La}{Al_2O_3} = \frac{79}{175}$ |
|---|---|---|---|
| Intg. Perf. |  |  |  |
| HC | 86 | < 91 | 92 |
| CO | 67 | < 74 | < 77 |
| $NO_x$ | 66 | 69 | < 75 |
| A/F = 14.85 |  |  |  |
| HC | 87 | 91 | 93 |
| CO | 92 | 96 | 97 |
| $NO_x$ | 32 | 31 | 34 |
| A/F = 14.56 |  |  |  |
| HC | 87 | < 92 | 94 |
| CO | 70 | < 78 | < 83 |
| $NO_x$ | 66 | 69 | 78 |

TABLE 3-continued

|  | Catalyst F 1.41 g/L Pd $\frac{Ce+La}{Al_2O_3} = \frac{95}{125}$ | Catalyst G 1.41 g/L Pd $\frac{Ce+La}{Al_2O_3} = \frac{127}{127}$ | Catalyst H 1.24 g/L Pd $\frac{Ce+La}{Al_2O_3} = \frac{79}{175}$ |
|---|---|---|---|
| A/F = 14.25 |  |  |  |
| HC | 49 | 48 | 47 |
| CO | 13 | 14 | 14 |
| $NO_x$ T50 Light off | 40 | 43 | < 41 |
| HC | 406 | 399 | < 399 |
| CO | 414 | 407 | < 402 |
| $NO_x$ | 416 | 409 | 408 |

EXAMPLE 4

(Comparative)

Two catalysts were prepared as in Example 1 except that in each the mol ratio of Ce to La was held constant at approximately 3.37/1. Catalyst J was formulated to approximate the composition of the prior art (i.e., Example 3 of U.S. Pat. No. 5,041,407, Williamson, et al.), which disclosed a Pd-only catalyst in which the ratio of Ce+La to $Al_2O_3$ is approximately 0.5 with an $Al_2O_3$ loading in excess of 100 g/L. Catalyst K was formulated to reflect the unexpected advantages of this invention, i.e., a reduced $Al_2O_3$ loading of approximately 15 g/L, much lower than previously thought necessary, and a ratio of Ce+La to $Al_2O_3$ of about 19.

The catalyst had the following compositions as prepared:

| Catalyst | J | K |
|---|---|---|
| Ce, g/L | 56.6 | 213.8 |
| La, g/L | 16.85 | 63.28 |
| Ba, g/L | 5.65 | 5.65 |
| Pd, g/L | 1.24 | 1.24 |
| Al, g/L | 143.8 | 14.77 |
| Ce/La | 3.36 | 3.38 |
| (Ce + La)/$Al_2O_3$ | 0.51 | 18.76 |

Catalysts J and K were aged for 75 hours using the more severe higher temperature cycle used in Tables 2b and 3 from Examples 2 and 3. Testing of the aged catalysts was then conducted as described in Example 1. Results are shown in Table 4 for conversions at 400° C., 450° C. and 482° C. at respective space velocities of 30 K/hr, 60 K/hr and 42 K/hr, all treating exhaust gas from an engine operating at stoichiometric A/F conditions.

TABLE 4

|  | % Conversion (400° C. Inlet, 30 K/hr) | | % Conversion (450° C. Inlet, 60 K/hr) | | % Conversion (482° C. Inlet, 42 K/hr) | |
|---|---|---|---|---|---|---|
| Integral Stoich | Cat- alyst J | Cat- alyst K | Cat- alyst J | Cat- alyst K | Cat- alyst J | Cat- alyst K |
| HC | 92 | 92 | 91 | 92 | 95 | 95 |
| CO | 61 | <76 | 51 | <70 | 49 | <78 |
| $NO_x$ | 70 | <74 | 66 | <72 | 69 | <78 |

It can be seen that the high ratio of (Ce+La)/$Al_2O_3$ unexpectedly improves the integral stoichiometric conversions of the catalyst, especially the CO and $NO_x$ conversion. It is believed that the demonstrated beneficial effect will also exist at $(Ce+La)/Al_2O_3$ ratios as low as 3.0.

EXAMPLE 5

(Comparative)

Catalyst I (Example 2) had an increased Ce plus La loading of about 275 g/L and the $Al_2O_3$ reduced to about 15 g/L. Catalyst I was compared to Catalyst E with Ce+La loading of 165 g/L and $Al_2O_3$ of 61 g/L. Catalysts E and I were aged for 75 hr using the more severe higher temperature cycle used in Tables 2b and 3 from Examples 2 and 3. The evaluation of the aged catalyst used a traverse of air fuel ratios from lean to rich as described in Example 1. Results are shown in Table 5 for conversions at 450° and 370° C., and at two space velocities (30K and 60K/hr).

Catalyst I (having higher Ce and La loadings with only 25% of the alumina loading of Catalyst E) has improved rich A/F conversions over Catalyst E with equivalent integral and stoichiometric conversions. These results show that with the unique washcoat support of this invention, Pd catalysts can be formulated using lower amounts of alumina (as low as ~15 g/L) than previously considered necessary to retain effective activity (i.e. ≧100 g/L).

TABLE 5

|  | % Conversion (450° C. Inlet, 30 K/hr) | | % Conversion (450° C. Inlet, 60 K/hr) | | % Conversion (370° C. Inlet, 30 K/hr) | |
| --- | --- | --- | --- | --- | --- | --- |
|  | Cat-alyst I | Cat-alyst E | Cat-alyst I | Cat-alyst E | Cat-alyst I | Cat-alyst E |
| Integral Stoich | | | | | | |
| HC | 93 | 93 | 91 | 91 | 91 | 90 |
| CO | 84 | 85 | 80 | 81 | 78 < | 86 |
| $NO_x$ | 82 | 79 | 75 | 76 | 75 < | 81 |
| A/F = 14.85 | | | | | | |
| HC | 94 | 93 | 93 | 93 | 91 | 90 |
| CO | 96 | 96 | 96 | 96 | 95 | 95 |
| $NO_x$ | 33 | 35 | 34 | 36 | 31 | 30 |
| A/F = 14.56 | | | | | | |
| HC | 95 | 94 | 92 | 93 | 91 | 92 |
| CO | 94 | 94 | 90 | 92 | 83 < | 94 |
| $NO_x$ | 94 | 90 | 81 | 85 | 77 < | 92 |
| A/F = 14.25 | | | | | | |
| HC | 70 > | 63 | 68 > | 63 | 58 > | 53 |
| CO | 24 | 22 | 23 | 20 | 29 | 31 |
| $NO_x$ | 90 >> | 65 | 91 > | 76 | 95 | 91 |
| 50% Conversion | Temperature °C. | | | | | |
| HC | 375 | 380 | | | | |
| CO | 384 | 382 | | | | |
| $NO_x$ | 378 | 382 | | | | |

EXAMPLE 6

(Comparative)

Catalyst D (Example 2) was compared to the commercial Pt/Rh TWC catalyst of Example 2 after aging using the methods previously described and with two different catalyst inlet temperatures. The results show that the catalyst of the invention (D) maintained activity better than the commercial Catalyst at the higher inlet temperature, demonstrating both better activity and durability.

TABLE 6

|  | 760° C. Aged | | | 850° C. Aged | | |
| --- | --- | --- | --- | --- | --- | --- |
|  | HC | CO | $NO_x$ | HC | CO | $NO_x$ |
| Integral % Conversions (450° C.: 30 K/h) | | | | | | |
| Pt/Rh | 90 | 79 | 79 | 82 | 61 | 69 |
| Catalyst D | 91 | 78 | 75 | 86 | 74 | 72 |
| Temperature (°C.): 50% Conversion | | | | | | |
| Pt/Rh | 386 | 379 | 365 | 412 | 411 | 398 |
| Catalyst D | 369 | 370 | 383 | 355 | 355 | 359 |

EXAMPLE 7

(Comparative)

Catalyst E (Example 2) was compared to the commercial Pt/Rh TWC catalyst of Example 2 with aging as previously described using a severe 850° C. inlet temperature. As in Example 6 the catalyst of the invention (E) demonstrated superior activity and durability.

TABLE 7

| A/F Ratio | % Conversion (450° C. Inlet) | | |
| --- | --- | --- | --- |
| (Stoich + /0.15 A/F) | Pt/Rh | | Catalyst E |
| Integral Performance | | | |
| HC | 92 | | 94 |
| CO | 72 | < | 90 |
| $NO_x$ | 79 | < | 84 |
| A/F at 14.85 | | | |
| HC | 95 | | 93 |
| CO | 97 | | 96 |
| $NO_x$ | 47 | > | 34 |
| A/F at 14.56 | | | |
| HC | 93 | | 95 |
| CO | 73 | < | 96 |
| $NO_x$ | 78 | < | 92 |
| A/F at 14.25 | | | |
| HC | 57 | < | 65 |
| CO | 33 | | 33 |
| $NO_x$ | 96 | | 94 |
| 50% Conversion, Temperature °C. | | | |
| HC | 406 | > | 359 |
| CO | 407 | > | 360 |
| $NO_x$ | 389 | > | 360 |

EXAMPLE 8

(Comparative)

A comparison was made of the sulfur tolerance of the commercial Pt/Rh TWC catalyst of Example 2 with a catalyst of the invention corresponding to Catalyst E (Example 2). The amount of sulfur (as tetra hydro thiophene added to the fuel) was increased and the exhaust gases measured according to FTP-75 (Federal Test Procedure 1975) standards on a 1987 Buick Somerset with a 2.5 liter engine. The results below show that the Pd-containing catalyst of the invention performs as well as the prior art Pt/Rh catalyst and is no more sensitive to sulfur poisoning. This also was unexpected.

TABLE 8

| Catalyst | Sulfur Level ppm in fuel | Total FTP-75 Performance (g/mi) | | |
|---|---|---|---|---|
| | | HC | CO | $NO_x$ |
| Pd | 14 | 0.07 | 1.72 | 0.18 |
| | 90 | 0.09 | 2.20 | 0.23 |
| | 500 | 0.10 | 2.42 | 0.24 |
| Pt/Rh | 14 | 0.10 | 1.78 | 0.17 |
| | 90 | 0.14 | 2.15 | 0.26 |
| | 500 | 0.19 | 2.86 | 0.25 |

Engine out Emissions: 1.20 g/mi HC; 6.80 g/mi CO; 1.50 g/mi $NO_x$

We claim:

1. A catalyst for reducing the amount of carbon monoxide, hydrocarbons, and nitrogen oxides in the exhaust gases from internal combustion engines comprising:

(a) a support disposed on a monolithic substrate, said support consisting essentially of alumina, ceria and lanthana and, optionally, from 5–20 wt percent of a promoter, and (b) a catalytically effective amount between about 0.05 to 5.0 wt. % based on the total weight of the catalyst of palladium disposed on the support of (a);

wherein the amount of cerium and lanthanum metals in the support is from about 80 g/L to about 300 g/L weight at a ratio of Ce to La of from 0.3/1 to 10/1;

wherein the amount of alumina in the support constitutes less than 50 weight percent of the support and is less than about 100 g/L; and wherein the weight ratio of Ce plus La to alumina in the support is greater than about 3.

2. The catalyst of claim 1 wherein the amount of cerium plus lanthanum is above 100 g/L.

3. The catalyst of claim 1 wherein the amount of cerium plus lanthanum is above 150 g/L.

4. The catalyst of claim 1 wherein the alumina content is about 60 g/L or less.

5. The catalyst of claim 1 wherein the alumina content is about 15 g/L or less.

6. The catalyst of claim 1 wherein the weight ratio of Ce to La is 0.5/1 to 6/1.

7. The catalyst of claim 1 wherein said palladium is about 1.4 g/L.

8. A method for reducing the amount of carbon monoxide, hydrocarbons, and nitrogen oxide in the exhaust gases from internal combustion engines comprising passing said gases at an effective temperature over the catalyst of claim 1.

* * * * *